March 14, 1961  K. N. VANN  2,974,445
TREE KILLING INSTRUMENT
Filed June 22, 1959  3 Sheets-Sheet 1
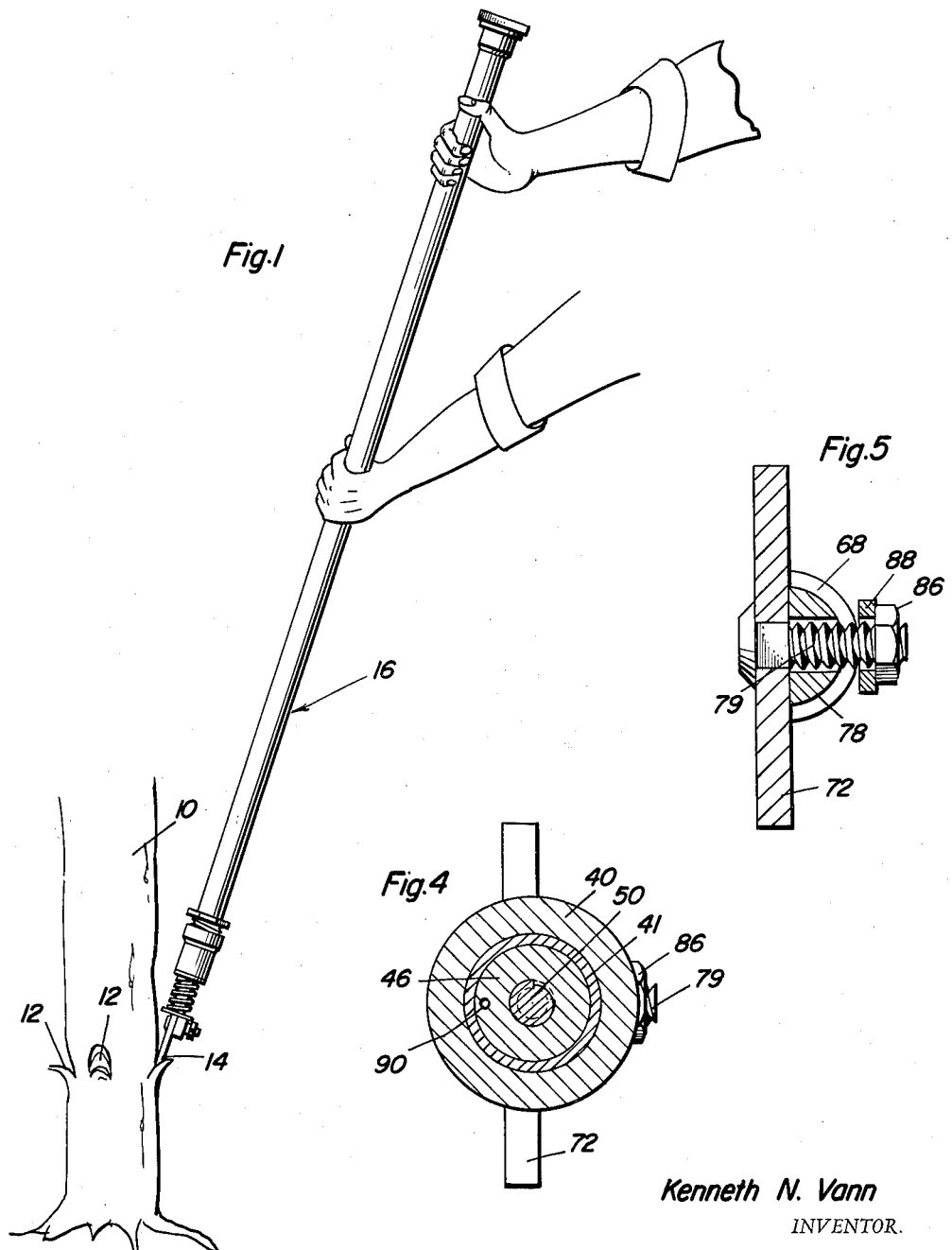
Kenneth N. Vann
INVENTOR.

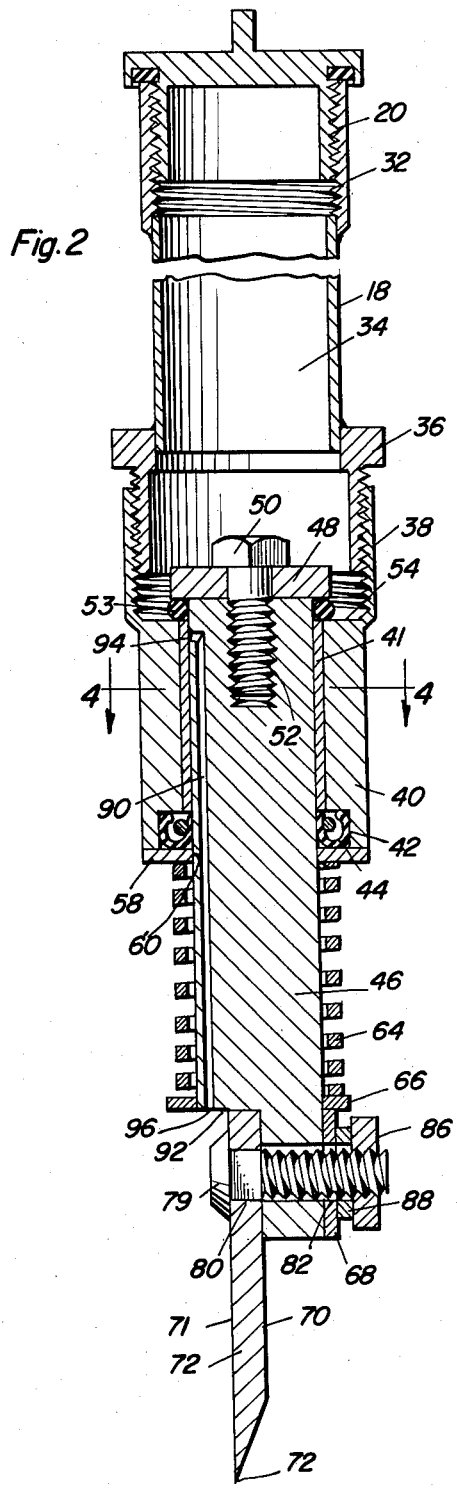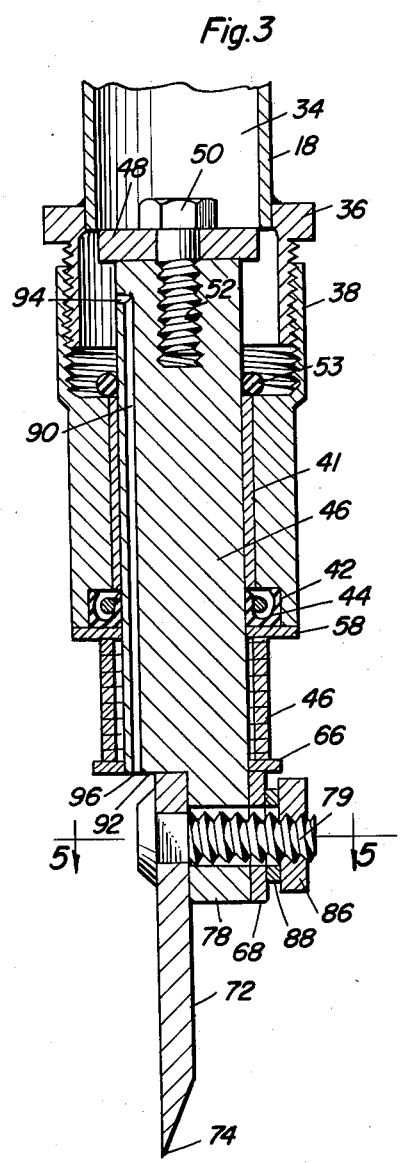

March 14, 1961  K. N. VANN  2,974,445
TREE KILLING INSTRUMENT
Filed June 22, 1959  3 Sheets-Sheet 3
Fig.6
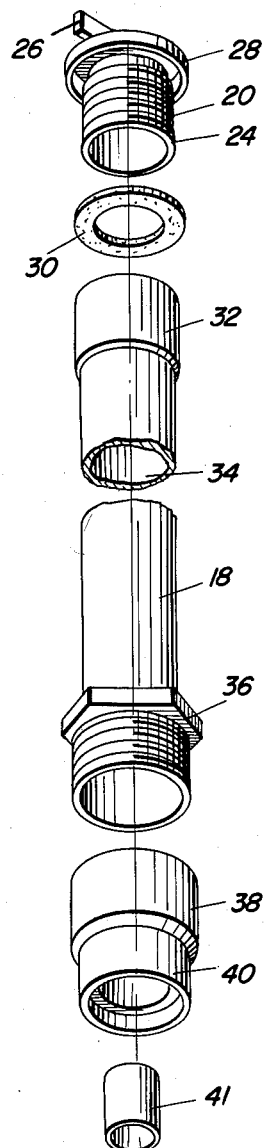
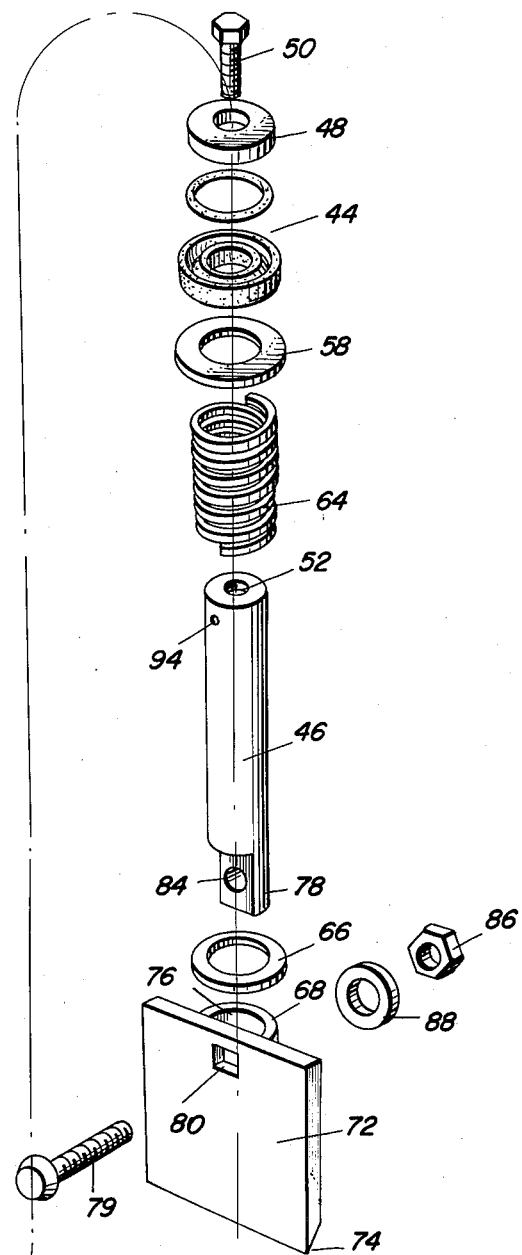
Kenneth N. Vann
INVENTOR.

United States Patent Office 2,974,445
Patented Mar. 14, 1961

2,974,445

TREE KILLING INSTRUMENT

Kenneth N. Vann, P.O. Box 396, Waycross, Ga.

Filed June 22, 1959, Ser. No. 821,825

6 Claims. (Cl. 47—57.5)

This is a continuation-in-part of co-pending application Serial No. 762,460, filed on September 22, 1958, now abandoned.

The invention pertains to an instrument for killing trees by injection of chemicals.

Numerous undesirable trees that suppress the growth and reproduction of desirable trees must be destroyed in order that the desirable trees may have rapid and full growth.

An object of the invention is to provide a unique instrument to facilitate administering one of the several commercially available liquid tree killing substances.

There are prior instruments to aid in the administration of such chemicals. An instrument in accordance with this invention is more easily used and considerably more effective in the application of liquid substance for killing trees. Further, the instrument in accordance with this invention is mechanically simple from a construction and manufacturing standpoint and as indicated previously, it is thought that this instrument operates considerably more effectively than all prior instruments to serve the same general purpose.

Accordingly, it is a further object of the invention to provide an inexpensive, considerably more effective instrument for the administration of tree killing liquids.

The operation of the instrument is such that the only thing that is required is that a person thrust the blade of the instrument at an angle of approximately 30 degrees to the tree trunk. The blade forms a cut in the tree trunk and the liquid substance is automatically released into the cut upon impact with the tree. The application of the liquid takes place very simply and without operation of a complicated pump mechanism which, upon repeated use, is often subject to mechanical failure.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1 is a perspective view of the instrument showing it in use.

Figure 2 is a longitudinal sectional view of the instrument.

Figure 3 is a fragmentary longitudinal sectional view similar to the view in Figure 2 but showing the blade in an inward position at which liquid substance from the liquid chamber is capable of flowing into the cut formed in the tree trunk above the blade.

Figure 4 is a transverse sectional view taken on the line 4—4 of Figure 2.

Figure 5 is a sectional view taken on the line 5—5 of Figure 3.

Figure 6 is an exploded perspective view of the parts from which the tree killing instrument is constructed.

In the accompanying drawings there is illustrated the lower part of a tree 10 having a plurality of cuts 12 made therein and cut 14 being made by instrument 16. The instrument is shown held by the hands of the operator and is arranged at approximately the suggested angle with respect to the tree trunk 10 to make cuts 12 and 14.

Instrument 16 is constructed of a hollow tube 18 which functions as the handle of the instrument. The upper end of the tube has a closure 20 thereon, and the closure consists of a hollow plug 24 with a finger-grip 26 on the upper wall thereof. A short skirt 28 depends from the upper wall of hollow plug 24 and contains a gasket 30 that seats on collar 32 which is welded or otherwise attached to a short extension to the upper end of the tube which forms the handle of the instrument. Part 32 is internally threaded so that the external threads on the hollow plug may be engaged therewith. Further, the plug closes the upper end of chamber 34 within which the liquid tree killing substance is maintained.

The lower end of tube 18 has an externally threaded fitting 36 fixed thereto and to which the upper internally threaded collar 38 is secured by being threaded thereon. This connects the cylinder 40 to the tube 18 inasmuch as cylinder 40 is made as a lower part of collar 38. Bronze bushing 41 is pressed into cylinder and is considered to be a part of the cylinder 40. The lower part of cylinder 40 has a circumferential groove 42 therein accommodating flexible seal 44 which contacts the outer surface of plunger 46.

Plunger 46 has a head 48 attached thereto, and the head may be constructed in a number of ways, one of which is to use a washer held attached to the innermost end of the plunger 46 by means of a bolt 50. The bolt is threaded in a tapped bore 52 extending axially of the plunger. A seal or gasket 53 for example an O-ring, seats upon shoulder 54 that divides collar 38 from the cylinder 40 and wipes against the outer surface of plunger 46.

Washer 58 has a central cylindrical opening 60 through which the plunger 46 passes. The washer bears against the lower surface of cylinder 40 and forms a seat for spring 64. The lower end of the spring seats on another washer 66 which is, in turn seated on the semi-cylindrical band 68 on the back face 70 of blade 72.

Blade 72 is approximately rectangular (Figure 7) or square and has a lower sharp cutting edge 74 adapted to pierce the bark and a part of the trunk of tree 10. Band 68 protrudes from the rear face or surface 70 thereof thereby forming a semi-cylindrical pocket 76 within which the semi-cylindrical blade holding shank 78 at the lowermost extremity of plunger 46 is accepted. Bolt 79 extends through apertures 80 and 82 in blade 72 and band 68 respectively and also aperture 84 in shank 78. The bolt 79 is held in place by a nut 86 backed by washer 88, the washer contacting the outer surface of band 68.

Passageway 90 extends from the lower face 92 of plunger 46 to an inlet orifice 94 opening laterally through the side of plunger 46 near the head thereof. The discharge port 96 at the lowermost extremity of passage 90 is in front of the front surface of blade 72 and at a place where the liquid passing through the passageway and leaving discharge port 70 flows down over the front face 71 of blade 72 so that the blade functions as a guide for the liquid substance in order to direct it into the cut 14 when the cut is being made. This assures that the liquid substance will flow directly into the cut so as to be most effective in its tree killing function.

In use and operation, the instrument 16 is held by two hands and thrusted downwardly and forwardly at an angle of approximately 30 degrees to the tree trunk. The blade 72 penetrates the tree trunk and forms a cut as shown in Figure 1. As the blade strikes the tree trunk, plunger 46 moves upward with reference to tube 18, entering chamber 34 and causing the inlet orifice or port 94 to be registered with the interior of chamber 34 so that liquid may flow from chamber 34 through passageway 90. There is some increase in pressure in chamber 34 as the plunger is thrust, in the manner described, into the chamber against the yielding opposition of spring 64. This pressure build-up is satisfied or relieved by having liquid substance from chamber 34 flow through passageway 90 and be discharged through port 96. When discharged in this way the liquid substance will flow toward the open part of cut 14 and be guided and directed by blade 72 so that it approaches and enters the tree trunk with certainty.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the invention as claimed.

What is claimed as new is as follows:

1. A tree killing instrument comprising the combination of a hollow handle, said hollow handle having a filler opening at one end thereof, a closure for said filler opening, means separably securing said closure to said handle, said hollow handle defining a liquid substance retaining chamber, a cylinder at the lower end of said hollow handle, a plunger reciprocatively operable in said cylinder, said plunger having a head, said head constituting means by which to seal the lower end of said chamber, said plunger having a passageway with an inlet port spaced from said head and an outlet port at the lower end thereof, said inlet port being in said cylinder and isolated from said chamber when said plunger is in a rest position, said inlet port being registered with said chamber when said plunger is moved inwardly of said chamber thereby registering said passageway with said chamber, a blade, means at the lower end of said plunger for supporting said blade, said passageway having an outlet port laterally spaced from the front face of said blade so that the liquid flowing through said passageway is discharged through said outlet port of said passageway above said front face of said blade so that said blade functions as a guide for the liquid substance as it is discharged through said outlet port.

2. A tree killing instrument comprising the combination of a hollow handle, said hollow handle having a filler opening at one end thereof, a closure for said filler opening, means separably securing said closure to said handle, said hollow handle defining a liquid substance retaining chamber, a cylinder at the lower end of said hollow handle, a plunger reciprocatively operable in said cylinder, said plunger having a head, said head constituting means by which to seal the lower end of said chamber, said plunger having a passageway with an inlet port spaced from said head and an outlet port at the lower end thereof, said inlet port being in said cylinder and isolated from said chamber when said plunger is in a rest position, said inlet port being registered with said chamber when said plunger is moved inwardly of said chamber thereby registering said passageway with said chamber, a blade, means at the lower end of said plunger for supporting said blade, said passageway having an outlet port laterally spaced from the front face of said blade so that the liquid flowing through said passageway is discharged through said outlet port of said passageway above said front face of said blade so that said blade functions as a guide for the liquid substance as it is discharged through said outlet port, and resilient means reacting on said plunger and said cylinder opposing the inward movement of said plunger and returning said plunger to a rest position after it is moved inwardly of said chamber.

3. A tree killing instrument comprising the combination of a hollow handle, said hollow handle having a filler opening at one end thereof, a closure for said filler opening, means separably securing said closure to said handle, said hollow handle defining a liquid substance retaining chamber, a cylinder at the lower end of said hollow handle, a plunger reciprocatively operable in said cylinder, said plunger having a head, said head constituting means by which to seal the lower end of said chamber, said plunger having a passageway with an inlet port spaced from said head and an outlet port at the lower end thereof, said inlet port being in said cylinder and isolated from said chamber when said plunger is in a rest position, said inlet port being registered with said chamber when said plunger is moved inwardly of said chamber thereby registering said passageway with said chamber, a blade, means at the lower end of said plunger for supporting said blade, said passageway having an outlet port laterally spaced from the front face of said blade so that the liquid flowing through said passageway is discharged through said outlet port of said passageway above said front face of said blade so that said blade functions as a guide for the liquid substance as it is discharged through said outlet port, resilient means reacting on said plunger and said cylinder opposing the inward movement of said plunger and returning said plunger to a rest position after it is moved inwardly of said chamber, said means for securing said blade to the lower end of said plunger including a band attached to the rear face of said blade, said plunger having a shank at the lower extremity thereof, said band cooperating with the rear face of said blade to form a pocket within which said shank is accommodated, and a fastener attaching said blade to said shank.

4. A tree killing instrument comprising a handle provided with a liquid substance chamber, a cylinder connected with said handle, a plunger operable in said cylinder, said plunger having a passageway extending longitudinally therethrough and having an inlet port registrable with said chamber and an outlet port at the lower part thereof, a blade, means for securing said blade to the lower end of said plunger and laterally adjacent to said outlet port so that upon discharge of liquid substance from said outlet port said blade functions as a guide for the liquid substance to guide it into a cut in the tree trunk formed by said blade as the blade is thrust into the tree trunk at an angle to the tree trunk, resilient means reacting on said plunger and said cylinder and opposing the movement of said plunger in one direction with reference to said chamber, said plunger having a head thereon, a gasket forming a stop for said head and located at one end of said cylinder, and said inlet port of said passageway isolated by said stop from said chamber when said plunger is in the extended position.

5. A tree killing instrument comprising a handle provided with a liquid substance chamber, a cylinder connected with said handle, a plunger operable in said cylinder, said plunger having a passageway extending longitudinally therethrough and having an inlet port registrable with said chamber and an outlet port at the lower part thereof, a blade, means for securing said blade to the lower end of said plunger in a position laterally adjacent to said outlet port so that upon discharge of liquid substance from said outlet port said blade functions as a guide for the liquid substance to guide it into a cut in the tree trunk formed by said blade as the blade is thrust into the tree trunk at an angle to the tree trunk, resilient means reacting on said plunger and said cylinder and opposing the movement of said plunger in one direction with reference to said chamber, said plunger having a head thereon, a gasket forming a stop for said head and located at one end of said cylinder, said inlet port of said passageway isolated by said stop from said chamber when said plunger is in the extended position, and said resilient means opposing the movement of said plunger in a direction inwardly of said chamber at which said inlet port is registered with said chamber.

6. A tree killing instrument comprising a handle, a cylinder connected with said handle, means defining a liquid substance containing chamber registered with said cylinder, a plunger operable in said cylinder, said plunger having a passageway extending longitudinally therethrough and having an inlet port registrable with said chamber and an outlet port at the lower part thereof, a blade, means for securing said blade to the lower end of said plunger and laterally adjacent to said outlet port so that upon discharge of liquid substance from said outlet port said blade functions as a guide for the liquid substance to guide it into a cut in the tree trunk formed by said blade as the blade is thrust into the tree trunk at an angle to the tree trunk, resilient means reacting on said plunger and said cylinder and opposing the movement of said plunger in one direction with reference to said chamber, said plunger having a head thereon, a gasket forming a stop for said head and located at one end of said cylinder, said inlet port of said passageway isolated by said stop from said chamber when said plunger is in the extended position, said blade securing means including a shank at the lower extremity of said plunger, said blade having a structure defining a pocket within which said shank is disposed, and fastening means attaching said blade to said shank.

References Cited in the file of this patent

UNITED STATES PATENTS

| | | |
|---|---|---|
| 1,110,182 | Blandin | Sept. 8, 1914 |
| 1,407,689 | Batterson | Feb. 28, 1922 |
| 1,934,080 | Meyer | Nov. 7, 1933 |
| 2,795,899 | Little | June 18, 1957 |